US010285556B2

(12) United States Patent
Gebhard et al.

(10) Patent No.: US 10,285,556 B2
(45) Date of Patent: May 14, 2019

(54) SYSTEM FOR ASSEMBLING AND/OR DISASSEMBLING A WIND TURBINE ELECTRIC GENERATOR

(71) Applicant: Windfin B.V., Leimuiden (NL)

(72) Inventors: Peter Gebhard, Velturno (IT); Norman Anselmi, Leimuiden (NL); Matteo Casazza, Val di Vizze (IT)

(73) Assignee: WINDFIN B.V., Leimuiden (NL)

( * ) Notice: Subject to any disclaimer, the term of this patent is extended or adjusted under 35 U.S.C. 154(b) by 720 days.

(21) Appl. No.: 14/769,391

(22) PCT Filed: Feb. 27, 2014

(86) PCT No.: PCT/IB2014/059315
§ 371 (c)(1),
(2) Date: Aug. 20, 2015

(87) PCT Pub. No.: WO2014/132225
PCT Pub. Date: Sep. 4, 2014

(65) Prior Publication Data
US 2016/0003216 A1 Jan. 7, 2016

(30) Foreign Application Priority Data

Feb. 27, 2013 (IT) ............................... MI2013A0288

(51) Int. Cl.
*F03D 13/10* (2016.01)
*A47L 11/34* (2006.01)
(Continued)

(52) U.S. Cl.
CPC ............... *A47L 11/34* (2013.01); *A47L 9/242* (2013.01); *A47L 9/248* (2013.01);
(Continued)

(58) Field of Classification Search
CPC . F03D 13/10; F03D 9/25; F03D 80/50; F05B 2240/916
See application file for complete search history.

(56) References Cited

U.S. PATENT DOCUMENTS

| | | | |
|---|---|---|---|
| 8,016,519 B2 * | 9/2011 | Bingham | B63B 27/10 405/209 |
| 8,230,802 B2 * | 7/2012 | Siegfriedsen | B63B 35/44 114/268 |

(Continued)

FOREIGN PATENT DOCUMENTS

| | | |
|---|---|---|
| DE | 10 2006 034 299 | 1/2008 |
| EP | 2 261 500 | 12/2010 |
| WO | WO 2014/132225 A1 | 9/2014 |

OTHER PUBLICATIONS

First Examination Report for New Zealand Patent Application No. 710896 dated Apr. 5, 2017, 3 pages.

(Continued)

*Primary Examiner* — A. Dexter Tugbang
*Assistant Examiner* — Jeffrey T Carley
(74) *Attorney, Agent, or Firm* — Neal, Gerber & Eisenberg LLP

(57) ABSTRACT

A method of assembling and/or disassembling a rotating electric machine of a wind turbine having a vertical structure; a main frame fitted to the top of the vertical structure; a blade assembly fitted to the main frame to rotate about a rotation axis; and a tubular rotating electric machine having a plurality of axial active segments; the method including inserting and/or extracting the active segments axially on the blade assembly side.

18 Claims, 4 Drawing Sheets

(51) Int. Cl.
*F03D 1/06* (2006.01)
*A47L 9/24* (2006.01)
*A47L 11/40* (2006.01)
*F03D 9/25* (2016.01)
*F03D 80/50* (2016.01)

(52) U.S. Cl.
CPC ........ *A47L 11/4088* (2013.01); *F03D 1/0658* (2013.01); *F03D 9/25* (2016.05); *F03D 13/10* (2016.05); *F03D 80/50* (2016.05); *F05B 2220/7066* (2013.01); *F05B 2240/916* (2013.01); *Y02E 10/721* (2013.01); *Y02E 10/725* (2013.01); *Y02E 10/728* (2013.01)

(56) References Cited

U.S. PATENT DOCUMENTS

| | | | | |
|---|---|---|---|---|
| 8,499,455 | B2* | 8/2013 | Suh | B66C 11/12 29/897 |
| 8,584,429 | B2* | 11/2013 | Zavitz | E04H 12/344 52/123.1 |
| 9,429,138 | B2* | 8/2016 | Matulewicz | B66D 1/60 |
| 2007/0200103 | A1* | 8/2007 | Viladomiu i Guarro | B66C 23/207 254/334 |
| 2009/0173573 | A1* | 7/2009 | Teichert | E04G 3/30 182/19 |
| 2010/0199487 | A1* | 8/2010 | Suh | B66C 11/12 29/596 |
| 2011/0042632 | A1* | 2/2011 | Van Berlo | F03D 13/10 254/264 |
| 2012/0073117 | A1* | 3/2012 | Benedict | H02K 7/1838 29/596 |
| 2013/0234443 | A1* | 9/2013 | Casazza | E04G 21/14 290/55 |
| 2015/0298943 | A1* | 10/2015 | Garcia De La Pena Razquin | B66C 23/207 414/10 |

OTHER PUBLICATIONS

International Search Report and Written Opinion for International Application No. PCT/IB2014/059315 dated May 2, 2014.
Notification Concerning Submission, Obtention or Transmittal of Priority Document (Form PCT/IB/304) for International Application No. PCT/IB2014/059315 dated May 16, 2014.
Notification of the Recording of a Change (Form PCT/IB/306) for International Application No. PCT/IB2014/059315 dated Mar. 31, 2015.

* cited by examiner

SYSTEM FOR ASSEMBLING AND/OR DISASSEMBLING A WIND TURBINE ELECTRIC GENERATOR

PRIORITY CLAIM

This application is a national stage application of PCT/IB2014/059315, filed on Feb. 27, 2014, which claims the benefit of and priority to Italian Patent Application No. MI2013A000288, filed on Feb. 27, 2013, the entire contents of which are each incorporated by reference herein.

BACKGROUND

Wind turbines for generating electric power normally comprise a vertical support; a main frame which rotates about a vertical axis with respect to the vertical support; a blade assembly, which comprises a hub and at least two blades fitted to the hub, and is connected to the main frame by at least one bearing to enable the blade assembly to rotate about a rotation axis; and a rotating electric machine rotated by the blade assembly and comprising a stator connected to the main frame, and a rotor connected to the blade assembly. The stator and rotor normally comprise respective tubular active parts facing each other and separated by an air gap.

The blade assembly on direct-drive wind turbines is connected rigidly to the rotor, and the bearing supports both the rotor and the blade assembly for rotation about the rotation axis. On direct-drive wind turbines, it is a fairly common practice to employ one bearing to absorb radial and axial forces and tipping moments. Whereas other wind turbine configurations employ two coaxial bearings. Each active part is usually divided into active segments fitted to a respective tubular structure and extending predominantly axially with respect to the rotation axis of the rotating electric machine.

Installing the wind turbine and servicing the rotating electric machine both involve assembling and/or disassembling the active segments of the rotating electric machine in a position that makes it relatively difficult to insert and/or extract and handle the active segments.

SUMMARY

The present disclosure relates to a method of assembling and/or disassembling a wind turbine rotating electric machine.

More specifically, the present disclosure relates to a method of assembling and/or disassembling active parts of a rotating electric machine fitted to the top of a wind turbine.

It is an advantage of the present disclosure to provide a relatively simple, relatively fast, and relatively efficient method of assembling and/or disassembling a wind turbine rotating electric machine.

According to the present disclosure, there is provided a method of assembling and/or disassembling a wind turbine rotating electric machine, the wind turbine comprising a vertical structure; a main frame fitted to the top of the vertical structure; a blade assembly fitted to the main frame to rotate about a rotation axis; and a tubular rotating electric machine comprising a plurality of axial active segments; the method comprising the step of inserting and/or extracting the active segments axially on the blade assembly side. This way, the rotating electric machine can be assembled and/or disassembled with none of the geometric constraints that impair speed and efficiency when inserting and/or extracting the active segments on the main frame side.

In certain embodiments, the method comprises connecting an insertion and extraction device to the blade assembly; and selectively positioning the insertion and extraction device close to one of the active segments by rotating the blade assembly. This way, the insertion and extraction device can be aligned selectively with an active segment for extraction, or with a seat in which to insert an active segment, by simply rotating the blade assembly.

In certain embodiments, the method comprises hoisting the insertion and extraction device. This way, the insertion and extraction device is assembled when needed.

In certain embodiments of the present disclosure, the method comprises hoisting the insertion and extraction device using a hoisting device, which is mounted on the wind turbine, extends through the wind turbine, and, in certain such embodiments, comprises a winch fixed to the wind turbine, and a cable extending through the rotating electric machine and the blade assembly. This way, the insertion and extraction device can simply be hoisted into a precise position along the blade assembly.

In certain embodiments, the method comprises the step of fixing a safety cell, configured to accommodate an operator, to the blade assembly; said insertion and extraction device being housed inside the safety cell. This enables the operator to work in the relatively utmost safety. And moreover, positioning the safety cell automatically positions the insertion and extraction device.

In certain embodiments, the method comprises the step of positioning the safety cell so that a first opening in the blade assembly is located at a second opening in the safety cell. In certain such embodiments, the first and second opening being configured to permit passage of an operator or objects.

The first opening mainly serves to run the winch cable out of the hub, for connection to the safety cell.

The second opening creates contiguity between the hub and the safety cell.

In certain embodiments of the present disclosure, the safety cell is cylindrical. This enables the operator an optimal stance in which to work, regardless of the angular position of the safety cell about the rotation axis.

In certain embodiments, the method comprises adjusting the radial distance of the insertion and extraction device with respect to the rotation axis. In other words, the insertion and extraction device is positioned using a system of polar coordinates about the rotation axis.

A further advantage of the present disclosure is to provide a relatively fast, and relatively efficient system of assembling and/or disassembling a wind turbine rotating electric machine.

According to the present disclosure, there is provided a system configured to assemble and/or disassemble a wind turbine rotating electric machine, the wind turbine comprising a vertical structure; a main frame fitted to the top of the vertical structure; a blade assembly fitted to the main frame to rotate about a rotation axis; and a tubular rotating electric machine comprising active segments; the system comprising an insertion and extraction device configured to insert and/or extract active segments axially on the blade assembly side. This eliminates certain of the physical and geometric constraints resulting in relatively cramped working conditions when inserting and/or extracting the active segments on the main frame side.

In certain embodiments of the present disclosure, the system comprises a connecting device configured to connect the insertion and extraction device to the blade assembly so as to selectively position the insertion and extraction device close to one of the active segments by rotating the blade assembly. This connection enables the blade assembly to be used as a positioning device to position the insertion and extraction device.

In certain embodiments, the system comprises a safety cell configured to fit to the blade assembly and to accommodate an operator; said insertion and extraction device being housed inside the safety cell. This enables the operator to operate the insertion and extraction device in the relatively utmost safety.

In certain embodiments, the safety cell is cylindrical and comprises at least one circular guide.

The circular guide serves to guide the insertion and extraction device.

More specifically, the system comprises a store configured to house active segments and movable along the circular guide.

The safety cell provides a structure by which to support accessory structures configured to relatively simplify and relatively speed up assembly and/or disassembly work.

In certain embodiments, the system comprises a service winch movable selectively along the circular guide. This way, active segments can be loaded into and unloaded from the safety cell without having to lower the safety cell.

In certain embodiments, the system comprises a manipulator configured to manipulate the active segments; the manipulator being movable selectively along the circular guide.

The active segments may be relatively extremely heavy, and must therefore be handled using suitable tools inside the safety cell.

Additional features and advantages are described in, and will be apparent from the following Detailed Description and the figures.

BRIEF DESCRIPTION OF THE DRAWINGS

A non-limiting embodiment of the present disclosure will be described by way of example with reference to the attached drawings, in which.

DETAILED DESCRIPTION

Figure 1:
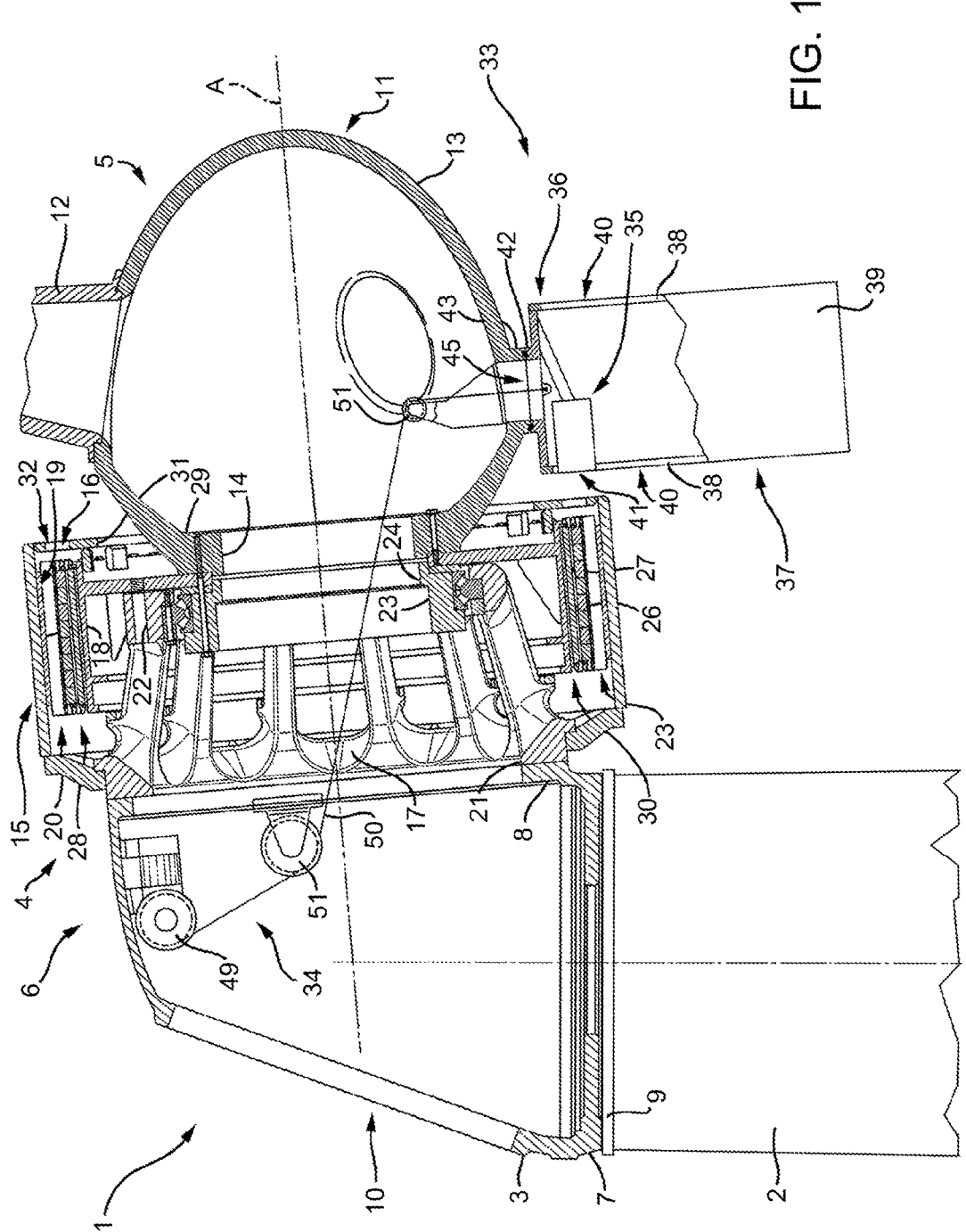
FIG. 1 shows a longitudinal section, with parts removed for clarity, of a system configured to assemble and/or disassemble a wind turbine rotating electric machine in accordance with the present disclosure.

Referring now to the example embodiments of the present disclosure illustrated in FIGS. 1 to 5, number 1 in FIG. 1 indicates as a whole a wind turbine configured to generate electric power. Wind turbine 1 is a direct-drive type and, in the example shown, comprises a vertical support 2; a main frame 3; a rotating electric machine 4; and a blade assembly 5 which rotates about a rotation axis A. Rotating electric machine 4 is located between main frame 3 and blade assembly 5, and, in addition to producing electric power, provides for supporting blade assembly 5, and for transmitting forces and moments induced by blade assembly 5 and rotating electric machine 4 to main frame 3.

In the example shown, main frame 3 is defined by a curved, tubular nacelle 6, which comprises a circular end flange 7 for connection to rotating electric machine 4; an end flange 8 configured to house a pivot 9 for connection to vertical support 2; and an opening 10 such as an opening substantially aligned with end flange 8.

Figure 2:
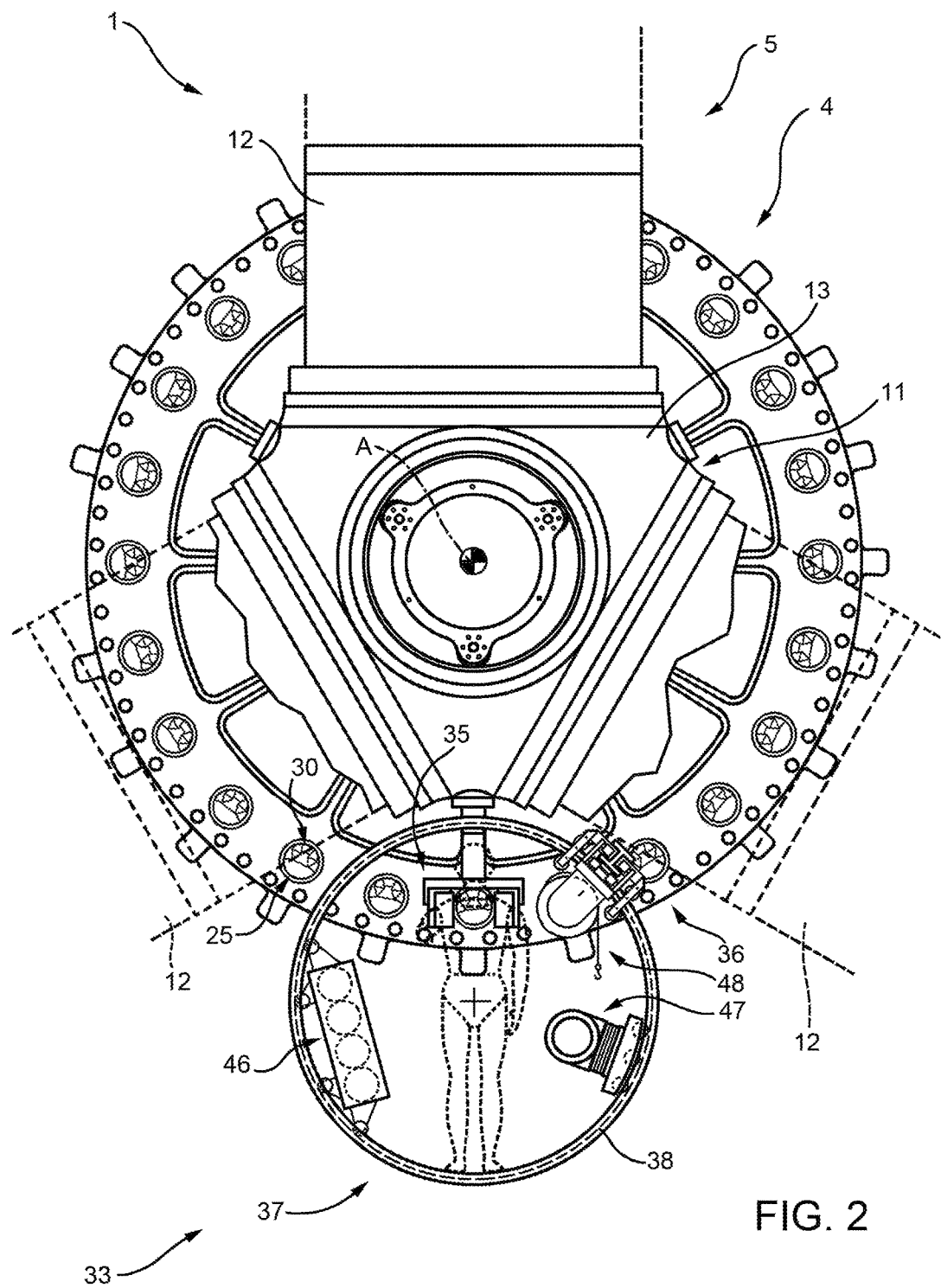
FIG. 2 shows a larger-scale elevation, with parts removed for clarity, of the FIG. 1 system.

Blade assembly 5 comprises a hub 11 connected to rotating electric machine 4; and a plurality of blades 12 (FIG. 2). Hub 11 comprises a hollow member 13 configured to support blades 12 (FIG. 2); and a flange 14 for connection to rotating electric machine 4.

Rotating electric machine 4 extends about rotation axis A, and is substantially tubular, so as to form a passage between the hollow main frame 3 and the hollow hub 11.

Rotating electric machine 4 comprises a stator 15; a rotor 16, which is located inside stator 15 and rotates about rotation axis A with respect to stator 15; and a frame 17 configured to connect rotating electric machine 4 to main frame 3, and configured to support blade assembly 5, stator 15, and rotor 16.

Frame 17 extends about rotation axis A, and comprises a tubular structure 18 having a cylindrical face 19 and configured to support a tubular active part 20 along cylindrical face 19; an annular flange 21 configured to connect rotating electric machine 4 to main frame 3 of wind turbine 1; and a ring 22 having an annular seat 23 configured to at least partly house a bearing 24. In the example shown, one bearing 24 supports both blade assembly 5 and rotor 16 integral with blade assembly 5. In other words, because tubular structure 18 forms part of tubular stator 15, frame 17 also defines part of tubular stator 15, which comprises tubular structure 18 and active part 20.

Tubular active part 20 is divided into a plurality of axial active segments 25, each of which, in the example shown, has electric windings supported of a substantially prismatic ferromagnetic core extending predominantly parallel to axis of rotation A.

In certain embodiments, active segments 25 are fitted to the structure by respective prismatic joints, so as to slide axially.

In certain embodiments, frame 17 and main frame 3 are connected by a bolted connection (not shown in the drawings) between annular flange 21 and end flange 8, and by which the forces and moments induced by rotating electric machine 4 and blade assembly 5 are transmitted to main frame 3.

In certain embodiments, rotating electric machine 4, (i.e., wind turbine 1), only has bearing 24 to support the radial and axial loads transmitted from tubular rotor 16 and blade assembly 5 to main frame 3.

Tubular rotor 16 comprises a tubular structure 26 having a cylindrical face 27; a tubular active part 28; and a radial structure 29 located inside tubular structure 26 and connected to bearing 24. In other words, radial structure 29 is fixed to bearing 24 on one side, and to hub 11—more specifically, to flange 14 of hub 11—on the opposite side.

Like active part 20, active part 28 comprises axial active segments 30, each of which, in the example shown, has permanent magnets fitted to respective magnetic guides, is prismatic in shape, and extends predominantly parallel to rotation axis A. In other words, rotating electric machine 4 is tubular, and communicates directly with hollow hub 11.

Dimensionally, active parts 20 and 28 have a minimum diameter larger than the maximum diameter of hub 11. And wind turbine 1 has a front casing 31, which, as shown in FIG. 1, has openings 32 by which to insert and remove active segments 25 and 30 on the hub 11 side. Alternatively, the casing may be removed completely or partly.

Generally speaking, wind turbine 1 as a whole is configured to permit insertion and removal of active segments 25 and 30 on the hub 11 side.

In FIG. 1, wind turbine 1 is connected to a system 33 by which to insert and/or extract active segments 25 and 30 of rotating electric machine 4 on the hub 11 side.

System 33 comprises a hoisting device 34; an insertion and extraction device 35 configured to insert and/or extract active segments 25 and/or 30 axially into/from rotating electric machine 4; and a connecting device 36 configured to connect insertion and extraction device 35 to blade assembly 5—more specifically, to hub 11.

In certain embodiments, connecting device 36 comprises a safety cell 37 configured to house at least one operator and a plurality of active segments 25 and/or 30, as shown more clearly in FIG. 2.

As shown in FIG. 1, safety cell 37 is cylindrical, and, in certain embodiments, comprises two circular guides 38 connected by a supporting structure 39. Safety cell 37 comprises two grille type curtain walls 40, one of which is configured to face rotating electric machine 4, and has an opening 41 by which to insert and/or extract active segments 25 and/or 30 (FIG. 1).

Safety cell 37 is configured to fix rigidly to blade assembly 5. More specifically, safety cell 37 is configured to fix to hub 11, and, in certain embodiments, comprises a connecting member 42 located along supporting structure 39, and which cooperates with a connecting member 43 located along hub 11, between two adjacent blades 12.

In certain embodiments, hub 11 and connecting member 42 have respective openings 44 and 45 to permit direct communication between hollow hub 11 and safety cell 37.

In the case of a relatively very large hub 11, openings 44 and 45 may even be formed to enable passage of the operator from hub 11 to safety cell 37 and vice versa.

As shown in FIG. 2, insertion and extraction device 35 is fixed to safety cell 37 with only relatively small radial adjustments enabled.

Safety cell 37 also supports a store 46 for active segments 25 and/or 30; a service winch 47; and a manipulator 48 configured to handle active segments 25 and/or 30 between insertion and extraction device 35 and store 46.

As shown in FIGS. 2 to 5, in certain embodiments, store 46, service winch 47, and manipulator 48 are mounted to run along at least one of guides 38 into different operating positions, depending on the position of, and the work to be carried out in, safety cell 37.

As shown in FIG. 1, hoisting device 34 comprises a winch 49 fitted to main frame 3; a cable 50 of winch 49, connectable to safety cell 37; and guide pulleys 51 configured to route cable 50 through rotating electric machine 4, hub 11, and opening 44.

Figure 3:
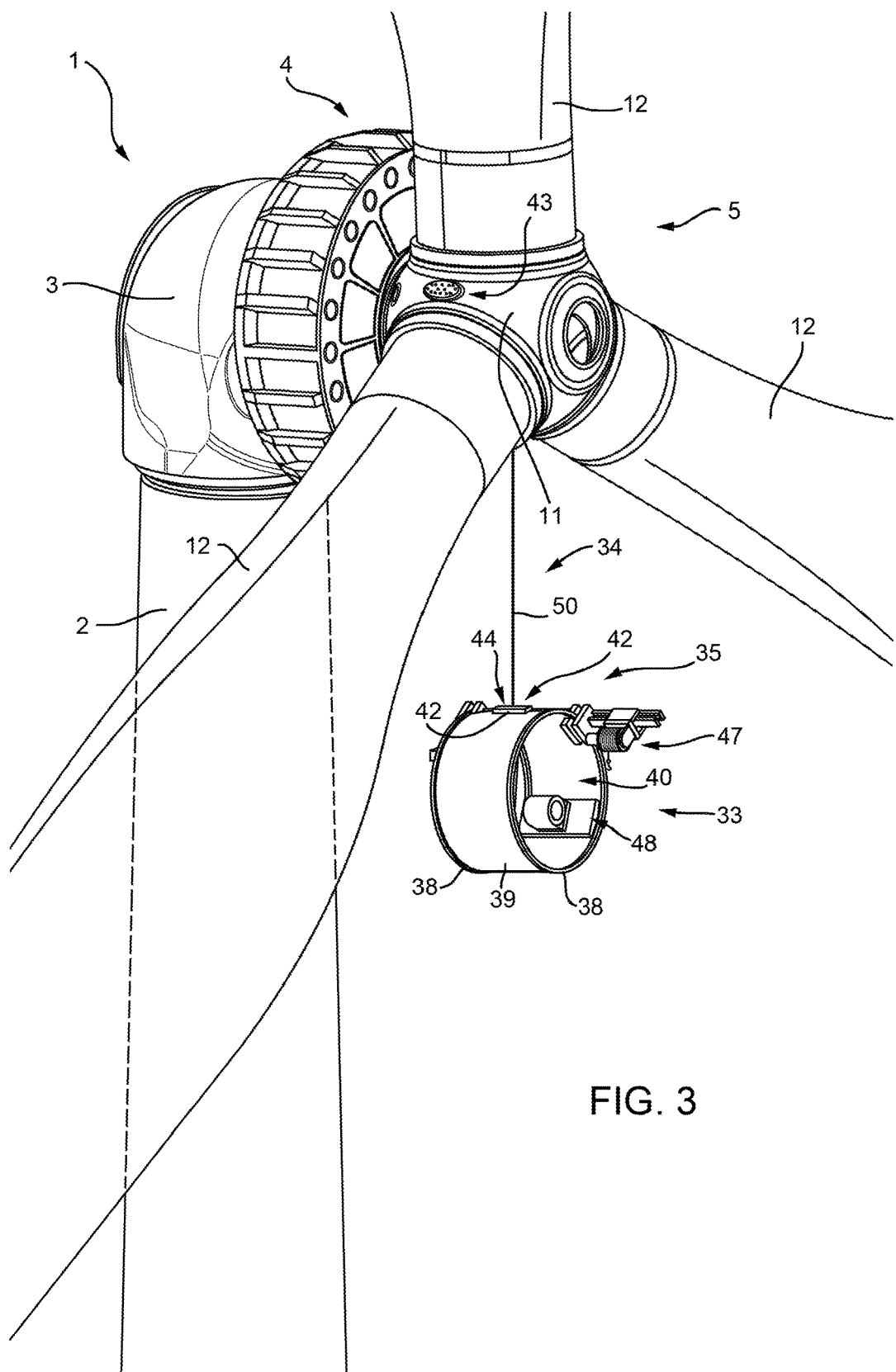
FIG. 3 shows a larger-scale view in perspective, with parts removed for clarity, of one operating stage of the FIG. 1 system.

In actual use, and as shown in FIG. 3, safety cell 37 and insertion and extraction device 35 are hoisted off the ground by hoisting device 34, and, once the assembly and/or disassembly work on wind turbine 1 is completed, are lowered back down to the ground and stowed.

Figure 4:
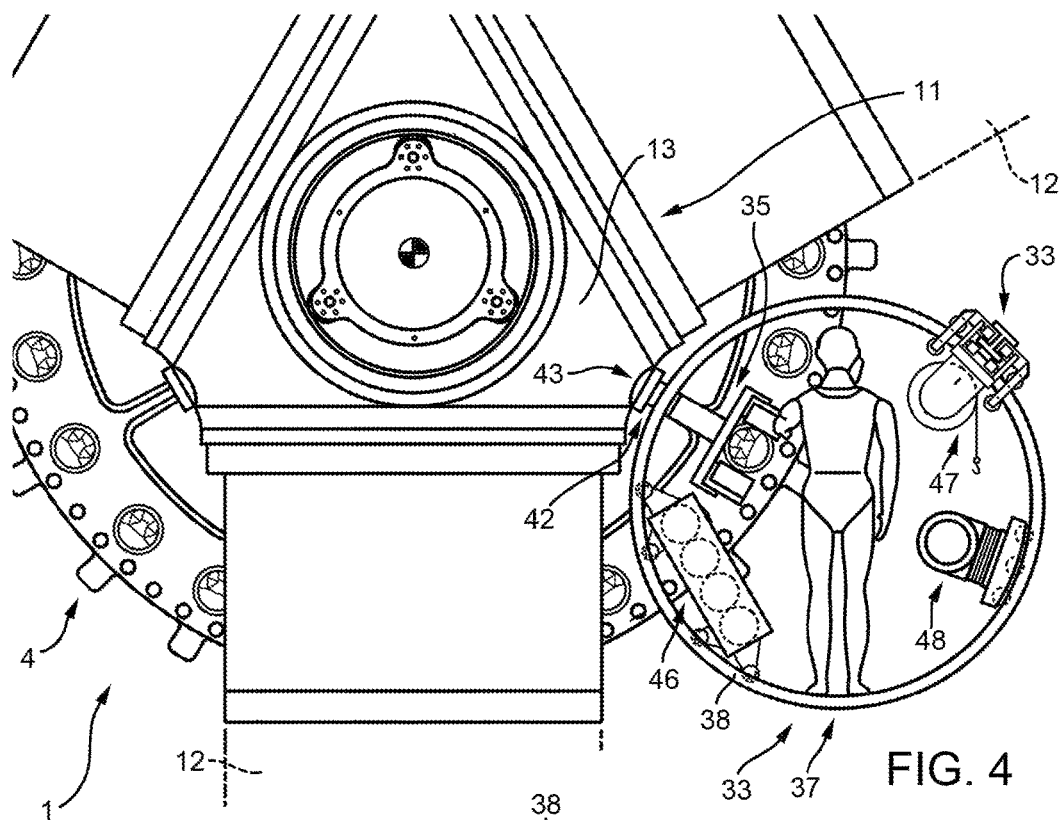
FIGS. 4 and 5 show larger-scale elevations, with parts removed for clarity, of further operating stages of the FIG. 1 system.
Figure 5:
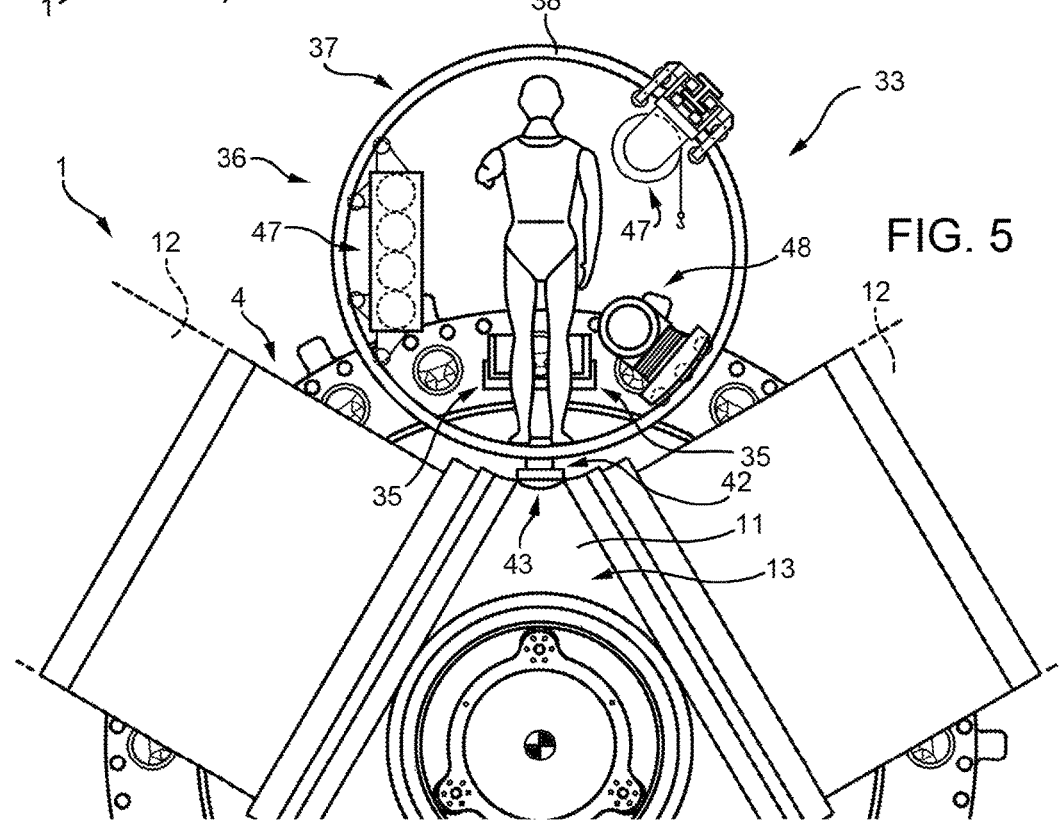

On reaching hub 11, insertion and extraction device 35 is fixed to blade assembly 5—in the example shown, to hub 11—as shown in FIG. 2, in which the insertion and extraction device is set to the six o'clock position. By rotating blade assembly 5 about rotation axis A, insertion and extraction device 35 can be aligned with any one of active segments 25. FIGS. 4 and 5 show insertion and extraction device 35 in the four o'clock and twelve o'clock positions respectively.

With reference to FIG. 1, the operator assigned to insert and/or extract active segments 25 travels to the work station at hub 11 inside safety cell 37, or, if openings 44 and 45 are large enough, accesses the safety cell from wind turbine 1.

The cylindrical shape of safety cell 37 enables the operator an optimal working position, regardless of the angular position of safety cell 37 about rotation axis A.

Clearly, changes may be made to the method and system according to the present disclosure without, however, departing from the protective scope of the accompanying Claims. That is, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A wind turbine rotating electric machine assembly device comprising:
   an insertion and extraction device configured to facilitate an insertion of at least one active segment axially from a blade assembly side of a wind turbine including a vertical structure, a main frame fitted to a top of the vertical structure, a blade assembly fitted to the main frame and configured to rotate about a rotation axis, and a tubular rotating electric machine including a plurality of active segments distinct from the at least one active segment; and
   a cylindrical safety cell configured to:
      fit to the blade assembly, and
      accommodate an operator, wherein said insertion and extraction device is housed inside the cylindrical safety cell.

2. The wind turbine rotating electric machine assembly device of claim 1, which includes a connecting device configured to:
   connect the insertion and extraction device to the blade assembly, and
   rotate the blade assembly to selectively position the insertion and extraction device a designated distance away from one of the plurality of active segments.

3. The wind turbine rotating electric machine assembly device of claim 2, which includes a hoisting device configured to hoist the insertion and extraction device to the blade assembly.

4. The wind turbine rotating electric machine assembly device of claim 3, wherein the hoisting device is mounted on the wind turbine and extends inside the wind turbine.

5. The wind turbine rotating electric machine assembly device of claim 4, wherein the hoisting device includes:
   a winch fixed to the wind turbine, and
   a cable extending through the tubular rotating electric machine and the blade assembly.

6. The wind turbine rotating electric machine assembly device of claim 1, wherein the cylindrical safety cell includes at least one circular guide.

7. The wind turbine rotating electric machine assembly device of claim 6, which includes a store configured to house the at least one active segment, said store being selectively movable along the circular guide.

8. The wind turbine rotating electric machine assembly device of claim 6, which includes a service winch selectively movable along the circular guide.

9. The wind turbine rotating electric machine assembly device of claim 6, which includes a manipulator configured to manipulate the at least one active segment, said manipulator being selectively movable along the circular guide.

10. A wind turbine rotating electric machine disassembly device comprising:
an insertion and extraction device configured to facilitate an extraction of at least one active segment axially from a blade assembly side of a wind turbine including a vertical structure, a main frame fitted to a top of the vertical structure, a blade assembly fitted to the main frame and configured to rotate about a rotation axis, and a tubular rotating electric machine including a plurality of active segments distinct from the at least one active segment; and
a cylindrical safety cell configured to:
fit to the blade assembly, and
accommodate an operator, wherein said insertion and extraction device is housed inside the cylindrical safety cell.

11. The wind turbine rotating electric machine disassembly device of claim 10, which includes a connecting device configured to:
connect the insertion and extraction device to the blade assembly, and
rotate the blade assembly to selectively position the insertion and extraction device a designated distance away from one of the plurality of active segments.

12. The wind turbine rotating electric machine disassembly device of claim 11, which includes a hoisting device configured to hoist the insertion and extraction device up to the blade assembly.

13. The wind turbine rotating electric machine disassembly device of claim 12, wherein the hoisting device is mounted on the wind turbine and extends inside the wind turbine.

14. The wind turbine rotating electric machine disassembly device of claim 13, wherein the hoisting device includes:
a winch fixed to the wind turbine, and
a cable extending through the tubular rotating electric machine and the blade assembly.

15. The wind turbine rotating electric machine disassembly device of claim 10, wherein the cylindrical safety cell includes at least one circular guide.

16. The wind turbine rotating electric machine disassembly device of claim 15, which includes a store configured to house the at least one active segment, said store being selectively movable along the circular guide.

17. The wind turbine rotating electric machine disassembly device of claim 15, which includes a service winch selectively movable along the circular guide.

18. The wind turbine rotating electric machine disassembly device of claim 15, which includes a manipulator configured to manipulate the at least one active segment, said manipulator being selectively movable along the circular guide.

* * * * *